United States Patent [19]
Nohmi et al.

[11] Patent Number: 5,473,382
[45] Date of Patent: Dec. 5, 1995

[54] VIDEO SIGNAL CONVERTING APPARATUS FOR CONVERTING AN INTERLACE VIDEO SIGNAL INTO A NON-INTERLACE VIDEO SIGNAL FOR REDUCTION

[75] Inventors: Makoto Nohmi, Katsuta; Tomohisa Kohiyama, Yokohama; Masami Yamagishi, Zama; Munekazu Kamo, Hadano, all of Japan

[73] Assignee: Hitachi, Ltd., Tokyo, Japan

[21] Appl. No.: 145,151

[22] Filed: Nov. 3, 1993

[30] Foreign Application Priority Data

Nov. 4, 1992  [JP]  Japan ................................ 4-294786

[51] Int. Cl.⁶ .................................................. H04N 7/01
[52] U.S. Cl. ........................................ 348/448; 348/441
[58] Field of Search ................................. 348/448, 441; H04N 7/01

[56] References Cited

U.S. PATENT DOCUMENTS 4,698,674  10/1987  Bloom ................................. 348/448
4,935,815  6/1990  Ichikawa et al. .................... 348/448

Primary Examiner—James J. Groody
Assistant Examiner—Cheryl Cohen
Attorney, Agent, or Firm—Antonelli, Terry, Stout & Kraus

[57] ABSTRACT

A method of converting and displaying scan lines for displaying interlace video signals permitting television or the like, represented by the NTSC standard, on a non-interlace display apparatus, including a reduction of images. Scan lines of a video signal are converted by a horizontal coordinate conversion circuit, a horizontal filtering circuit, a vertical coordinate conversion circuit, a vertical filtering circuit, and a one-scan line portion of line memory. The coordinates are converted on the basis of the coordinate system of the frame of the interlace video signal; and filtering in the vertical direction is performed in field units based on the coordinate conversion.

7 Claims, 17 Drawing Sheets

FIG. 7B

| Ys(t) | $\Delta$ ys | $\Delta$ y's | $\Delta$ y"s |
|---|---|---|---|
| EVEN | EVEN | $\Delta$ ys/2 | $\Delta$ ys/2 |
| EVEN | ODD | ($\Delta$ ys+1)/2 | ($\Delta$ ys-1)/2 |
| ODD | EVEN | $\Delta$ ys/2 | $\Delta$ ys/2 |
| ODD | ODD | ($\Delta$ ys-1)/2 | ($\Delta$ ys+1)/2 |

FIG. 11

CONVERSION FACTOR    1/R=2.5

| Yd | Ysf | Ys(t) | Ys(t+1) | ys(t') | ys(t'+1) | ys(t'+1) |
|----|-----|-------|---------|--------|----------|----------|
| 0  | 0.0 | 0     | 2       | 0      | 2        | —        |
|    |     |       |         | 1      | —        | 3        |
| 1  | 2.5 | 2     | 5       | 2      | 4        | —        |
|    |     |       |         | 3      | —        | 5        |
|    |     |       |         | 4      | 6        | —        |
| 2  | 5.0 | 5     | 7       | 5      | —        | 7        |
|    |     |       |         | 6      | 8        | —        |
| 3  | 7.5 | 7     | 10      | 7      | —        | 9        |
|    |     |       |         | 8      | 10       | —        |
|    |     |       |         | 9      | —        | 11       |
| 4  | 10.0| 10    | 12      | 10     | 12       | —        |
|    |     |       |         | 11     | —        | 13       |
| 5  | 12.5| 12    | 15      | 12     | 14       | —        |
|    |     |       |         | 13     | —        | 15       |
|    |     |       |         | 14     | 16       | —        |
| 6  | 15.0| 15    | 17      | 15     | —        | 17       |
|    |     |       |         | 16     | 18       | —        |
| 7  | 17.5| 17    | 20      | 17     | —        | 19       |
|    |     |       |         | 18     | 20       | —        |
|    |     |       |         | 19     | —        | 21       |

VIDEO SIGNAL CONVERTING APPARATUS FOR CONVERTING AN INTERLACE VIDEO SIGNAL INTO A NON-INTERLACE VIDEO SIGNAL FOR REDUCTION

BACKGROUND OF THE INVENTION

1. Field of the Invention

The present invention relates to a method of converting and displaying scan lines, including a reduction of pictures, for displaying interlace video signals for a television or the like represented by the NTSC standard on a non-interlace display apparatus such as a computer display and so on.

2. Description of the Related Art

For compressing a frequency band of television video signals of NTSC or the like, an interlace system is employed to divide one screen or one frame into two fields formed by even and odd scanning lines, respectively. On the other hand, display apparatuses for personal computers and so on employ in recent years a non-interlace system for preventing flickers on a picture. To display a picture for television on a display apparatus for personal computers or the like, therefore, an interlace video signal must be converted into a non-interlace signal and displayed after enlargement or reduction is performed if that required.

In this case, when the size of a picture is not changed, a non-interlace video signal is simply digitized into one frame, i.e., two fields of the picture, and once stored in a frame memory. The stored video signal is read out in synchronism with the frame period of a computer, converted into an analog video signal and displayed.

On the other hand, when the size of a picture is reduced for display, while this often achieved by simply thinning the scan lines to a half (one field), and further to a quarter (½ fields), the size reduction processing is performed by use of a frame memory for performing filtering processing between scan lines if a high image quality is required at an arbitrary reduction ratio.

In this way, conventionally, when display is performed at an arbitrary reduction ratio, one scan line for display is generated by converting a plurality of corresponding scan lines in an inputted video signal into a video signal of one scan line by the filtering processing. However, since an interlace video signal includes adjacent scan lines which exist in both the even field and the odd field, it need be processed in such a manner that a one-frame portion of the video signal is once stored in a frame memory, and scan line data is sequentially read out, filtered, and then written into a frame buffer for display, as described also in JP-A-64-591.

SUMMARY OF THE INVENTION

With the above-mentioned prior art, however, an input frame memory of a large capacity has been indispensable.

If this input frame memory were removed, the filtering processing associated with a size reduction would have to be performed in field units, wherein the filtering processing is independently performed for each field, so than the processing muse be performed with a half of effective scan lines in a video signal. For this reason, the number of scan lines in a field becomes smaller than the scan lines to be displayed after the conversion, in spite of the size reduction, thus presenting a problem that the substantial resolution of the picture becomes lower after the size reduction.

It is an object of the present invention to remove the need for a frame memory of large capacity as mentioned above and to simplify a display circuit so as to reduce the size and cost of a video signal converting apparatus, as well as to prevent the resolution from being degraded.

To achieve the above-mentioned object, a video signal converting method for converting and displaying scan lines according to the present invention is characterized by converting the coordinate value of a video signal into the coordinate of a displayed video signal in frame units for an even field and an odd field constituting a frame of an input video signal, in accordance with a previously given relationship, and filtering each of the even and odd fields based on the converted coordinate. When a plurality of input scan lines correspond to one display scan line for reduction, written data of a scan line which is written only one of the even and odd periods is left as it is in the other period.

Specifically, when a number of input scan lines is reduced to a number of display scan lines, a case in which one input scan line corresponds to one display scan line is combined with a case in which two input lines correspond to one display scan line, depending on display coordinate locations, thus realizing a reduction which is not a simple 1/n (n: an integer). In this event, for collecting a plurality of input scan lines to one display scan line (this is hereinafter referred to as "scan line joint"), a number of joined scan lines $\Delta ys$ is set in the frame coordinate system, in which both the fields are combined, irrespective of whether they are even or odd scan lines. As a result, in a display frame buffer, data on input even scan lines are written in corresponding locations in an even field period, while data on input odd scan lines are written in an odd field period. Further, as to a scan line which is written in only one of the even and odd periods, written data is left as it is in the other period.

On the other hand, for a reduction of a half or less, since the number of joined lines $\Delta ys$ is two or more, there is no display scan line which is not renewed, so that scan line data on either an even or an odd scan line are written. When $\Delta ys$ is three or more, a case may arise where two or more input scan lines correspond to one display scan line at the period of one field. In this event, an average value of data on the plurality of scan lines is calculated in correspondence to dots and written as display data. In this way, the frame memory for input is made unnecessary.

The foregoing and other objects, advantages, manner of operation and novel features of the present invention will be understood from the following detailed description when read in connection with the accompanying drawings.

BRIEF DESCRIPTION OF THE DRAWINGS

FIG. 7B is a table which corresponds numbers of joined scan lines to numbers of joined input lines in even and odd fields;

FIG. 11 is a correspondence table of input lines to displayed lines when the conversion factor is 4/10;

DESCRIPTION OF THE PREFERRED EMBODIMENTS

Embodiments of the present invention will hereinafter be described in connection with the accompanying drawings.

Figure 1:
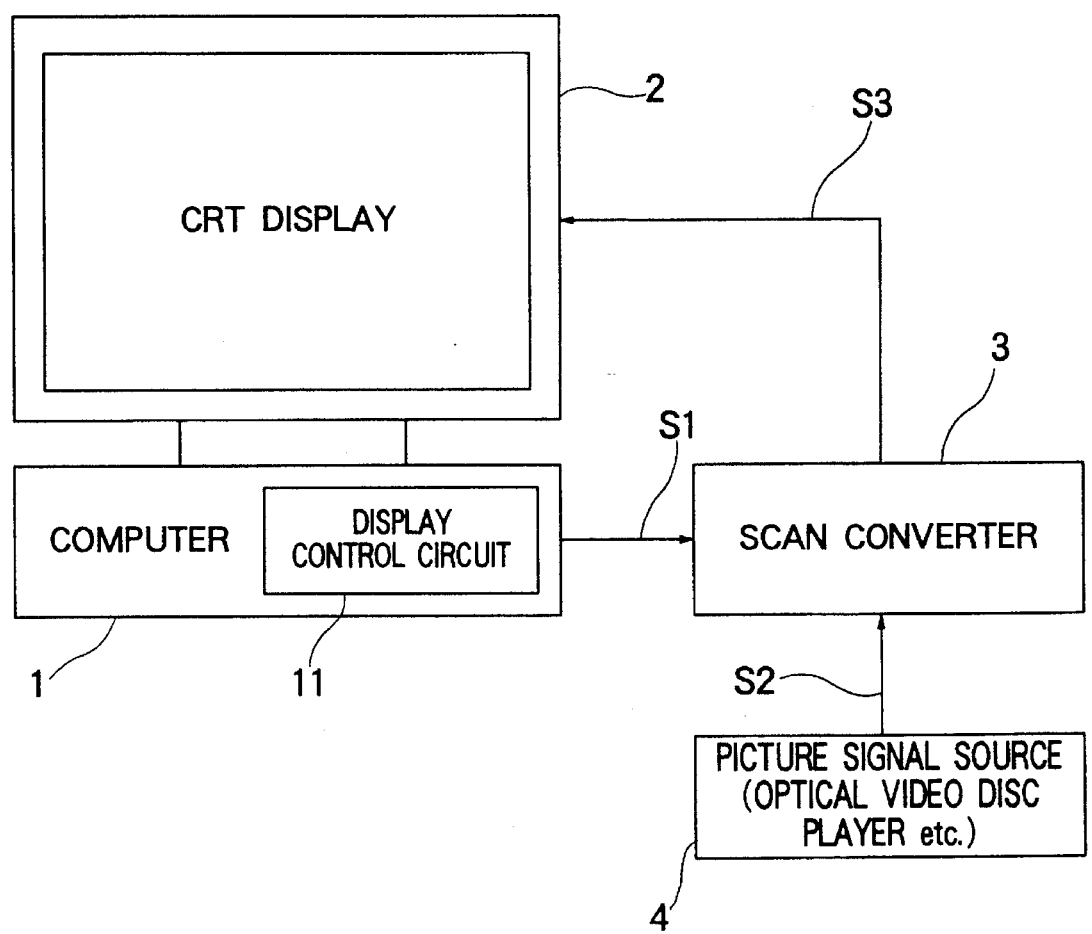
FIG. 1 is a diagram showing an exemplary configuration of a video signal display system to which the present invention is applied.

FIG. 1 shows the configuration of a whole system, including a so-called multi-media supporting computer, to which the present invention is applied, for superimposing a television picture on a display apparatus of the computer. Reference numeral 1 designates the computer; 2 a CRT display; and 3 a scan converter. Results processed by the computer 1 are displayed on the display 2 as characters, figures, pictures and so on, and further, an image from a picture signal source 4, such as a television broadcast, laser disc player (LD player) and so on, is displayed on the screen of the computer, such that it is superimposed on other characters, figures and so on. For this purpose, a video signal S1 created by a display control circuit 11 of the computer 1 and an NTSC video signal S2 for a picture of the television or the like are superimposed by scan converter 3, after performing scan line conversion and synchronization of frames, to generate a superimposed video signal S3 which is then supplied to the display 2 and displayed.

Figure 2:
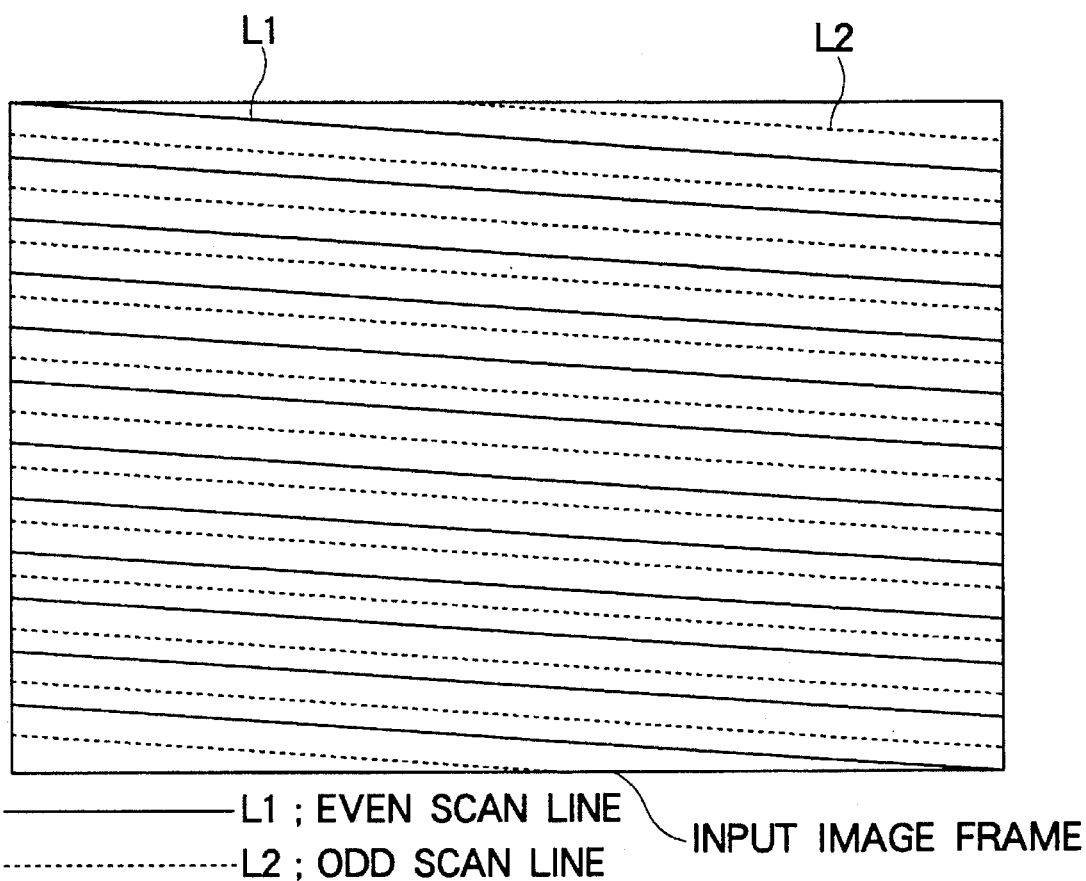
FIG. 2 is an explanatory diagram of a video signal which is an object of the present invention.
Figure 3:
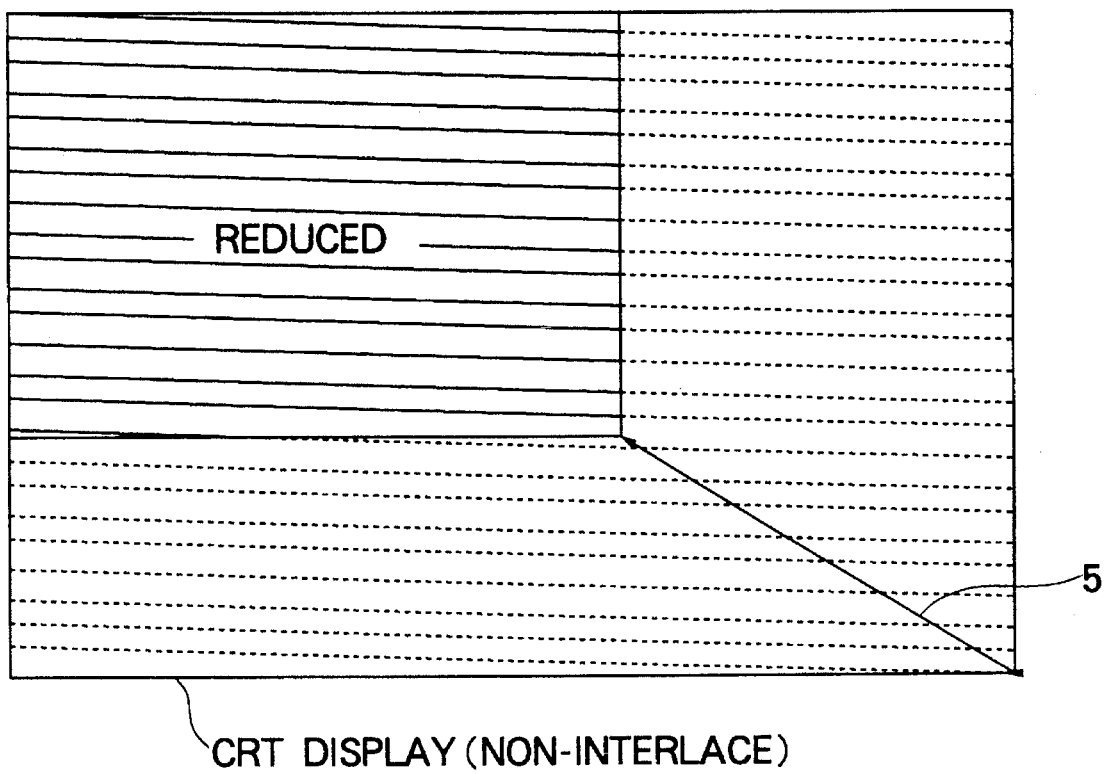
FIG. 3 is a diagram showing an exemplary display of a picture reduced by scan line conversion according to the present invention.

Since the NTSC video signal S2 has its frequency band compressed, the interlace system is employed, wherein one screen or one frame thereof is divided into fields respectively formed by even (indicated by a solid lines L1) and odd (indicated by a broken lines L2) scan lines, as shown in FIG. 2, such that they are interlace-scanned. On the other hand, the CRT display 2 of the computer 1 employs the sequentially scanning non-interlace system for preventing flickers on images. Therefore, for displaying a picture of the picture signal source 4, such as a television, on the CRT display 2 of the computer 1, the interlace video signal S2 is converted into a non-interlace signal by the scan converter 3 as shown in FIG. 3, and reduced in size 5 if it is required for display.

Incidentally, while in FIG. 1, the scan converter 3 is illustrated as an external circuit of the computer 1 for clarifying the function of the present invention, it does not preclude incorporating the same in the computer 1.

Figure 4:
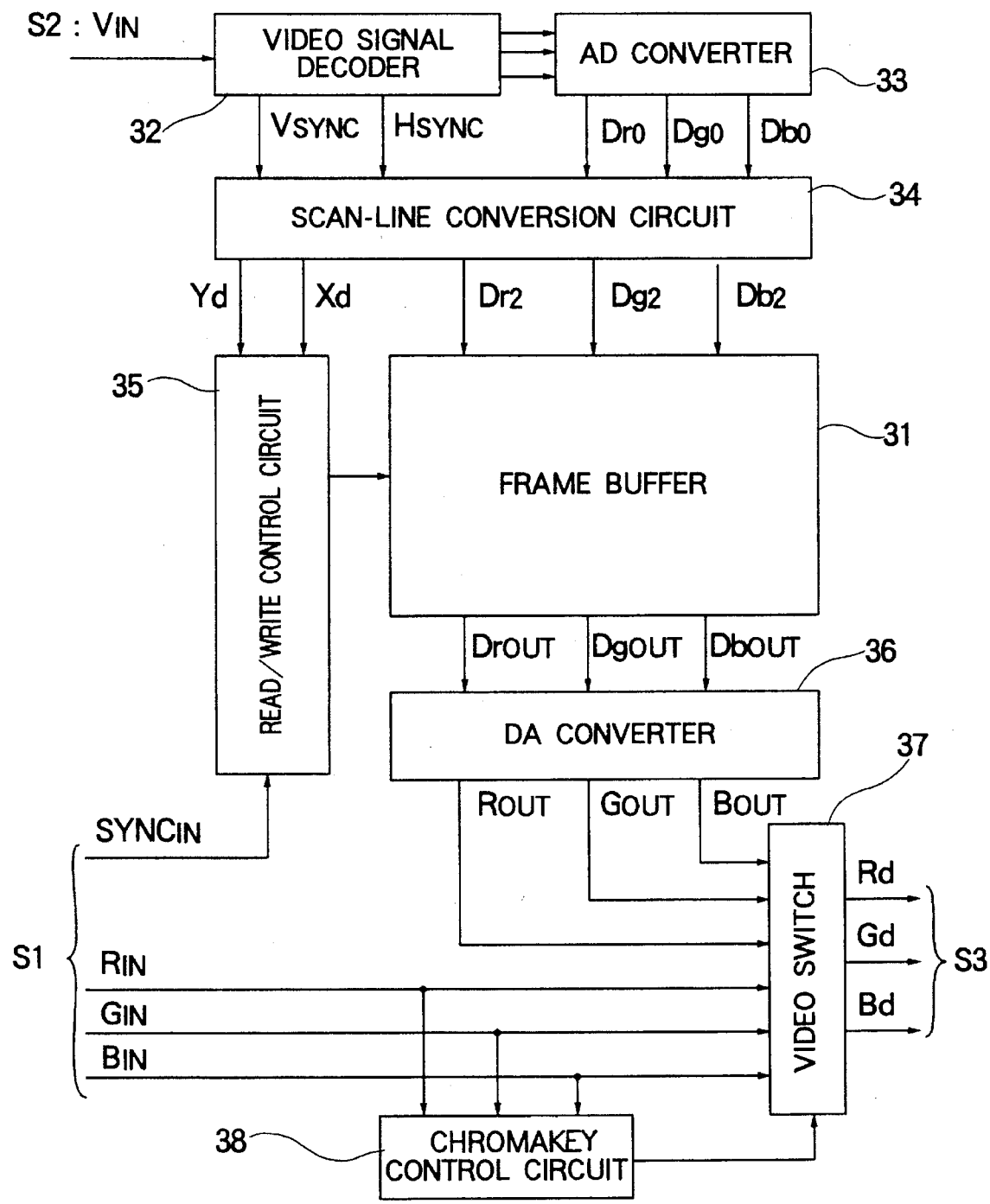
FIG. 4 is a diagram showing an exemplary configuration of a scan converter which is one embodiment of the present invention.

Next, FIG. 4 shows the circuit configuration of the scan converter 3. Reference numeral 31 designates a frame buffer for performing scan line conversion to generate a video signal synchronized to the frame frequency of the computer; and 32 a video decoder, fed with an analog video signal (NTSC video signal) S2 inputted from the picture signal source 4 such as a television, LD player or the like, for decoding a composite video signal of the television to component signals, for example RGB or the like, in order to execute the scan line conversion operation. Reference numeral 33 designates a video AD converter for converting a decoded analog video signal into digital video data; and 34 a scan-line conversion circuit for fetching the digital data of every scan line to perform the scan-line conversion and for writing the converted data into the frame buffer. Also, reference numeral 35 designates a write/display control circuit, or read/write control circuit, for controlling the writing of the converted digital video data into the frame buffer 31, and the reading of the written digital video data in synchronism with vertical and horizontal scans of a displayed frame of the computer 1; and 36 a video DA converter for converting the read digital video data into an analog video signal. Further, reference numeral 37 designates a video switch for superimposing the converted output analog video signals Rout, Gout, Bout and the computer video signal S1 supplied from the computer 1; and 38 a chromakey control circuit which detects a color of the computer video signal S1 for switching the video switch.

In FIG. 4, a composite video signal input Vin (:S2) inputted to the video decoder 32 is converted into component video signals R, G, B in 32, thereafter digitized by the video AD converter 33, and inputted to the scan-line conversion circuit 34. Incidentally, the video decoder 32 also extracts a vertical synchronizing signal Vsyc and a horizontal synchronizing signal Hsync included in the input video signal simultaneously with the conversion to the component video signals R, G, B, and the respective synchronizing signals Vsync, Hsync are supplied to the scan-line conversion circuit 34.

Digital video data Dr0, Dg0, Db0 inputted to the scan-line conversion circuit 34 are subjected, for each input scan line, to determination of the display coordinate location in the horizontal direction, determination of the number of joined dots, and reduction conversion in the horizontal direction by a horizontal coordinate conversion circuit 341 and a horizontal filtering circuit 342, later described, and are further subjected to determination of the display coordinate location in the vertical direction, determination of the number of joined scan lines, and reduction conversion in the vertical direction by a vertical coordinate conversion circuit 343 and a vertical filtering circuit 344, also described later, whereby they are converted into scan lines less in number than the input video signal Vin (:S2) and written into the frame buffer 31 based on the control of the write/display control circuit 35. Digital video data Dr2, Dg2, Db2 are once stored in the frame buffer 31 so as to absorb the difference in period between the input analog video signal S2 and the computer video signal S1.

On the other hand, the frame buffer write/display control circuit 35, for reading out digital video data in the frame buffer 31 in synchronism with the frame period of the computer 1, controls the reading of video data Drout, Dgout, Dbout from the frame buffer 31 in synchronism with the vertical horizontal synchronizing signal Syncin which is supplied thereto as a part of the video signal S1 from the display control circuit 11 of the computer 1. The read video data Drout, Dgout, Dbout, passing through the video DA conversion circuit 36 and the video switch 37, are combined with video outputs Rin, Gin, Bin of the computer 1 and displayed on the screen of the CRT display 2 in FIG. 1.

In FIG. 4, Vin is inputted as a color video signal, and the frame buffer 31 and so on are configured corresponding to color components, for example, red, green and blue (R, G, B), whereas FIG. 1 illustrates a collective representation including them.

Figure 5:
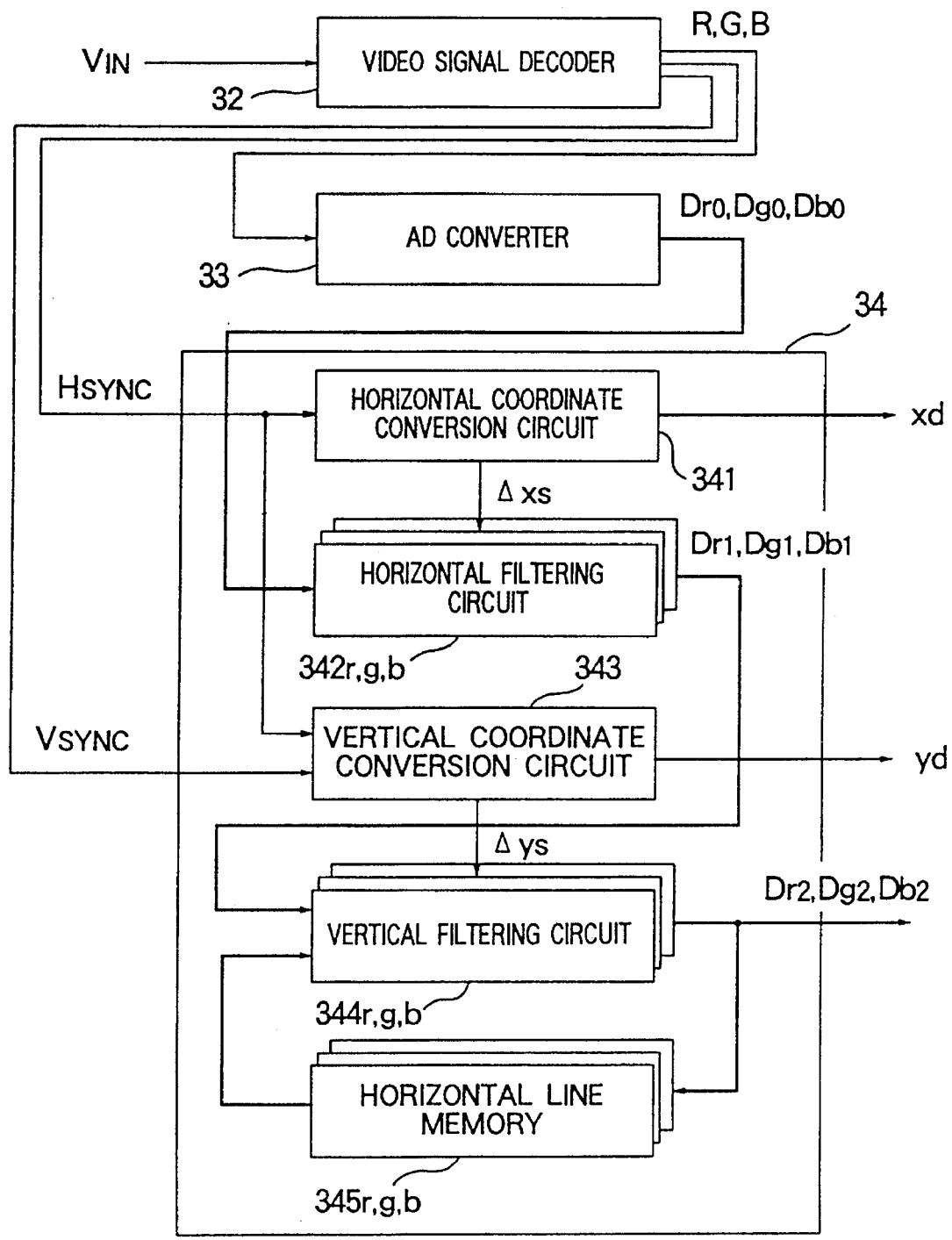
FIG. 5 is a block diagram showing an exemplary configuration of a scan line coordinate conversion circuit in FIG. 4.

Next, FIG. 5 shows an example of the configuration of the scan-line conversion circuit 34 which constitutes a main portion of the present invention. Reference numeral 341 designates the horizontal coordinate conversion circuit; 342 the horizontal filtering circuit; 343 the vertical coordinate conversion circuit; 344 the vertical filtering circuit; and 345 a horizontal line memory. The horizontal filtering circuit 342 and the vertical filtering circuit 344 may include three independent lines corresponding to the video component data Dr0, Dg0, Db0 for executing parallel processing, or may have one line so as to be commonly used for time-division processing. Shown herein is the case where the circuits are individually provided for executing parallel processing, and the filtering circuits 342 and 344 are each suffixed with r, g or b.

In FIG. 5, based on the vertical and horizontal synchronizing signals Vsync, Hsync supplied from the video decoder 32, and parameters related to a display coordinate location, number of joined dots and number of joined scan lines instructed by the computer 1, the vertical coordinate conversion circuit 343 and the horizontal coordinate conversion circuit 341 calculate a display coordinate location Yd in the vertical direction, a display coordinate location Xd in the horizontal direction, a number of joined dots $\Delta xs$ and a number of joined scan lines $\Delta ys$ of inputted digital video data Dr0, Dg0 or Db0.

On the other hand, the horizontal filtering circuit 342 sequentially receives the digital video data Dr0, Dg0, Db0 delivered from the video AD converter, and calculates for each component an average value of video data including the number of joined dots, specified by the horizontal coordinate conversion circuit 341, which is delivered to the vertical filtering circuit 344 as Dr1, Dg1 or Db1. The vertical filtering circuit 344 in turn receives the video data Dr1, Dg1, Db1 which have the dot size changed in the horizontal direction, employs the horizontal line memory 345 as a temporarily storing memory, sequentially calculates in the horizontal direction a portion corresponding to the number of joined scan lines of the video data Dr1, Dg1, Db1 as average values Dr2, Dg2, Db2 in the vertical direction, and sequentially writes them into addresses corresponding to the display coordinate locations Yd, Xd in the frame buffer 31, which have been calculated in the vertical and horizontal coordinate conversion circuits 343, 341.

The present invention features that in the vertical coordinate conversion circuit 343 and the vertical filtering circuit 344, the coordinate conversion is performed in the coordinate system in the frame units, and the video data joining processing, i.e., filtering is performed in the field units based on the converted coordinates for an even field and an odd field constituting a frame of an analog input video signal. The circuit configuration for this purpose will be explained in connection with FIGS. 6 and 7.

Figure 6:
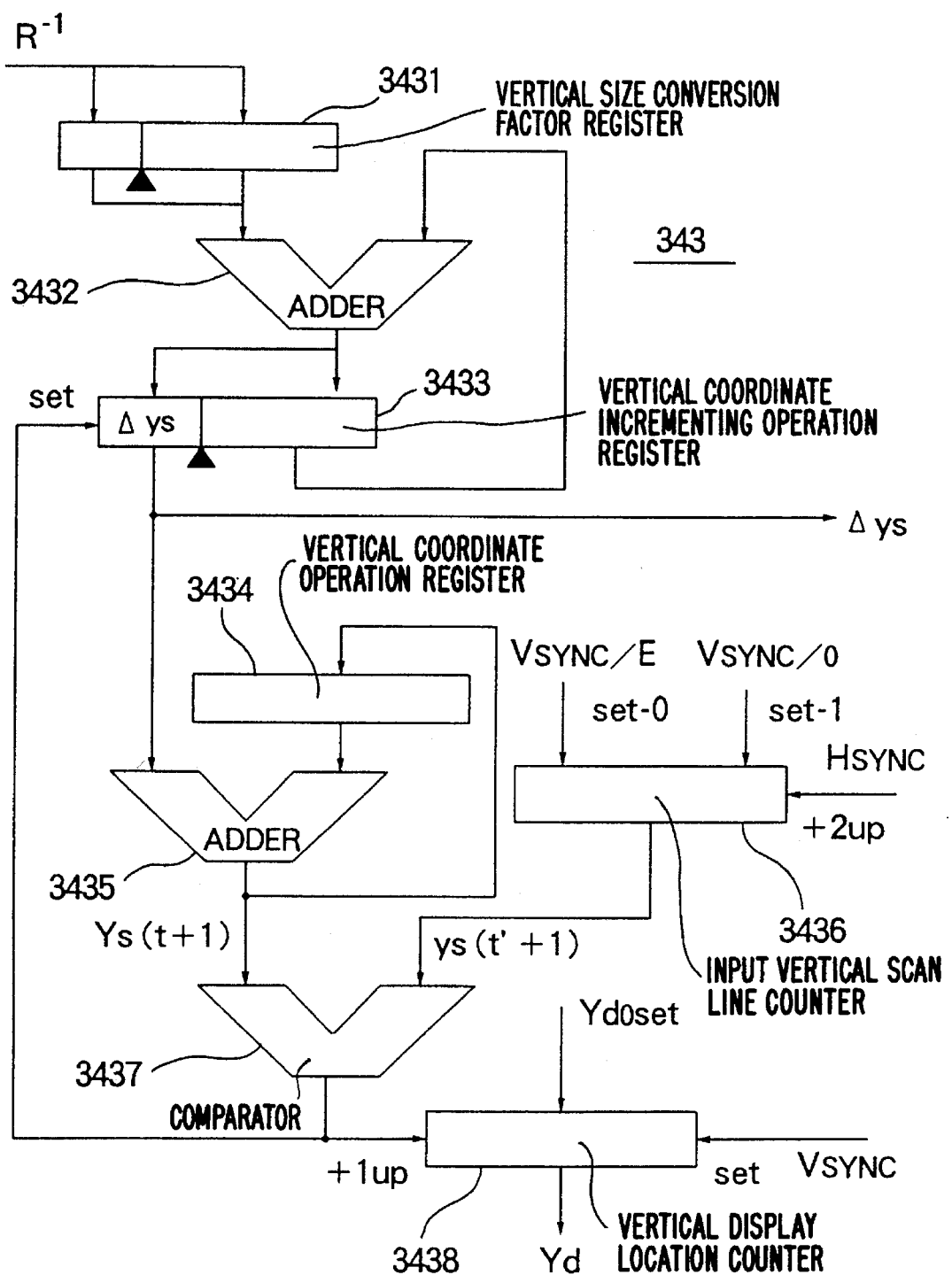
FIG. 6 is a diagram showing an exemplary configuration of a vertical scan line coordinate conversion circuit.

FIG. 6 shows the vertical coordinate conversion circuit 343 in detail, where reference numeral 3431 designates a vertical size conversion factor register; 432 an adder; 3433 a vertical coordinate incrementing operation register; 3434 a vertical coordinate operation register; 3435 an adder; 3436 an input vertical scan line counter; 3437 a comparator; and 3438 a vertical display location counter.

Figure 7A:
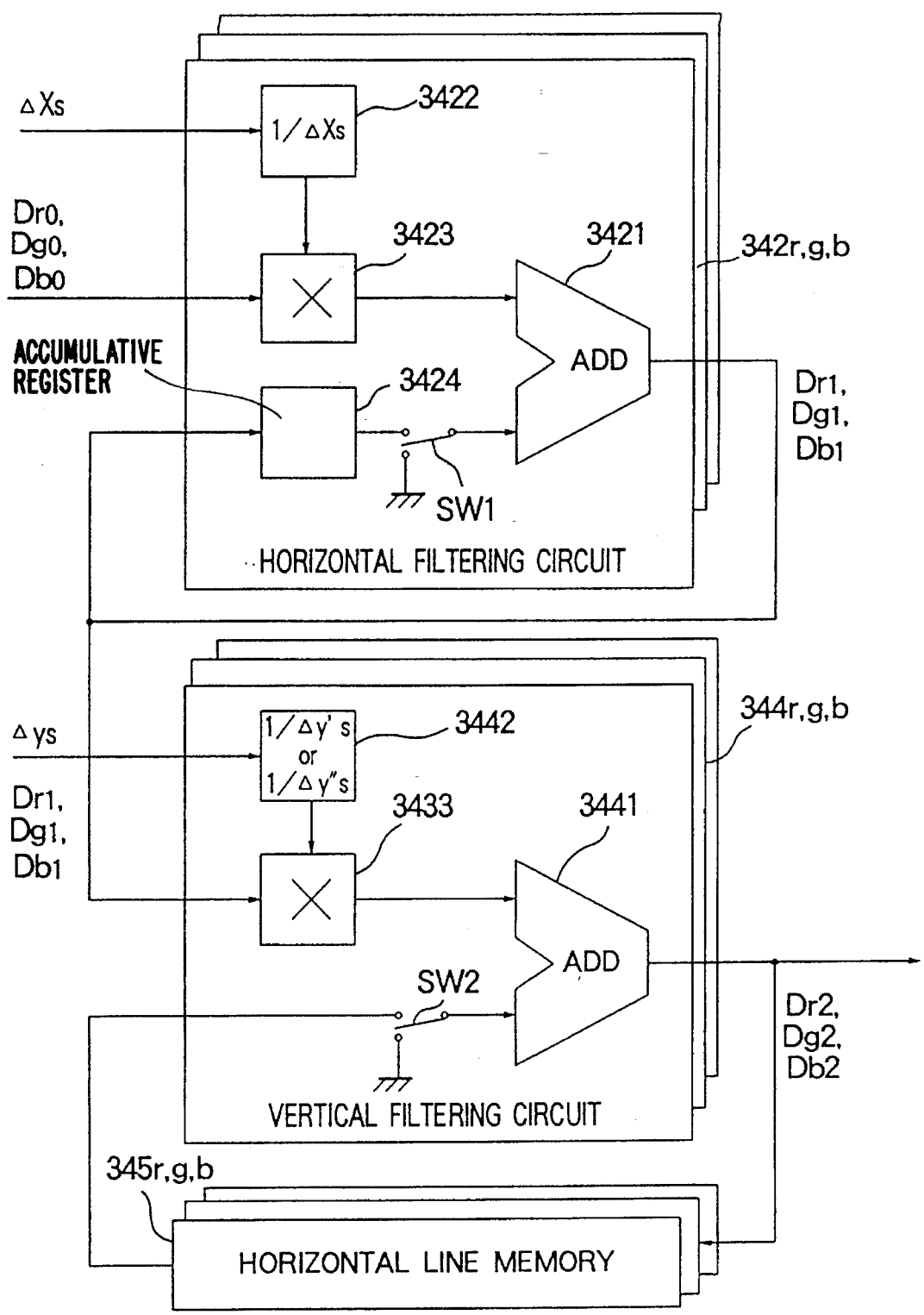
FIG. 7A is a diagram showing an exemplary configuration of a filtering circuit in FIG. 5.

FIG. 7A shows an exemplary configuration of the filtering circuit in FIG. 5.

The vertical filtering circuit 344 calculates the numbers of joined input lines $\Delta y's$ and $\Delta y''s$ in the even and odd fields based on the number of joined scan lines $\Delta ys$ calculated by the vertical coordinate conversion circuit 343, and joins portions of data corresponding to those numbers of scan lines into a line of corresponding scan line data in each of the even and odd fields. FIG. 7 shows a method of simply taking an average of a plurality of scan lines of video data in the dot directions for each of the components R, G, B. More specifically, the horizontal line memory 345 provided for each component is employed for the data Dr1, Dg1, Db1 delivered from the horizontal filtering circuit 342 such that data of scan lines to be joined is accumulated, in correspondence to the dots, in the horizontal line memory 345 by means of the adder 3441. Dot data thus accumulated Dr2, Dg2, Db2 are delivered to the frame buffer 31 at a processing timing of the last scan line in the joined scan line block. Also simultaneously with this, one input of the adder 3441 is initialized by a switch SW2.

A factor circuit 3442 in this case calculates the numbers of the joined input lines $\Delta y's$ and $\Delta y''s$ in the even and odd fields and supplies an inverse of the value of the number of joint input lines $\Delta y's$ or $\Delta y''s$ to a multiplier 3433 which calculates an average value in dot units for the number of scan lines $\Delta y's$ in the even field or $\Delta y''s$ in the odd field by consequently dividing the dot data by $\Delta y's$ or $\Delta y''s$. The same effect may be obtained by finally deriving $1/\Delta y's$ or $1/\Delta y''s$ with a divider circuit rather than the multiplication.

Incidentally, the horizontal filtering circuit 342 substantially has a similar configuration to the vertical filtering circuit 344. More specifically, reference numeral 3422 designates a factor circuit; 3423 a multiplier; 3421 an adder; and 3424 an accumulative register. Digitized pixel data Dr0, Dg0, Db0 are multiplied by a factor $1/\Delta xs$ to accumulate the number of joint pixels $\Delta xs$ for each of the components such that averaged pixel data Dr1, Dg1, Db1 are derived. Also, simultaneously with this, one input of the adder 3421 is initialized by a switch SW1.

While the foregoing has described the components of a color picture represented by R, G, B, the same may apply to a representation by Y, U, V or Y, I, Q where the color video signal is separated into a luminance component and color difference components.

FIG. 7B is a table showing the correspondence of the number of joined scan lines $\Delta ys$ to the numbers of joined input lines $\Delta y's$ and $\Delta y''s$ in the even and odd fields.

When the number of joined scan lines $\Delta ys$ is even, a half of the number of joined scan lines $\Delta ys$ is assigned to the numbers of joined input lines $\Delta y's$ and $\Delta y''s$ in the fields. On the other hand, when the number of joined scan lines $\Delta ys$ is odd, $\Delta y's$ and $\Delta y''s$ depend on whether a scan line joint boundary Ys(t) is even or odd. When the scan line joint boundary Ys(t) is even, $(\Delta ys+1)/2$ is assigned to $\Delta y's$ while ($\Delta$ys−1)/2 to $\Delta$y"s. When the scan line joint boundary Ys(t) is odd, ($\Delta$ys−1)/2 is assigned to $\Delta$y's while ($\Delta$ys+1)/2 to $\Delta$y"s. Further, assuming that the least significant bit of the scan line joint boundary Ys(t) is designated LSB(Ys(t)) (LSB; Least Significant Bit), the numbers of joined input lines $\Delta$y's and $\Delta$y"s in the even and odd fields may be expressed by:

$$\Delta y's=[\{\Delta ys+notLSB(Ys(t))\}/2]$$

$$\Delta y''s=[\{\Delta ys+LSB(Ys(t))\}/2]$$

where the brackets [] represent the Gaussian symbol and mean an integer with its digits below the decimal point being rounded off.

Figure 7C:
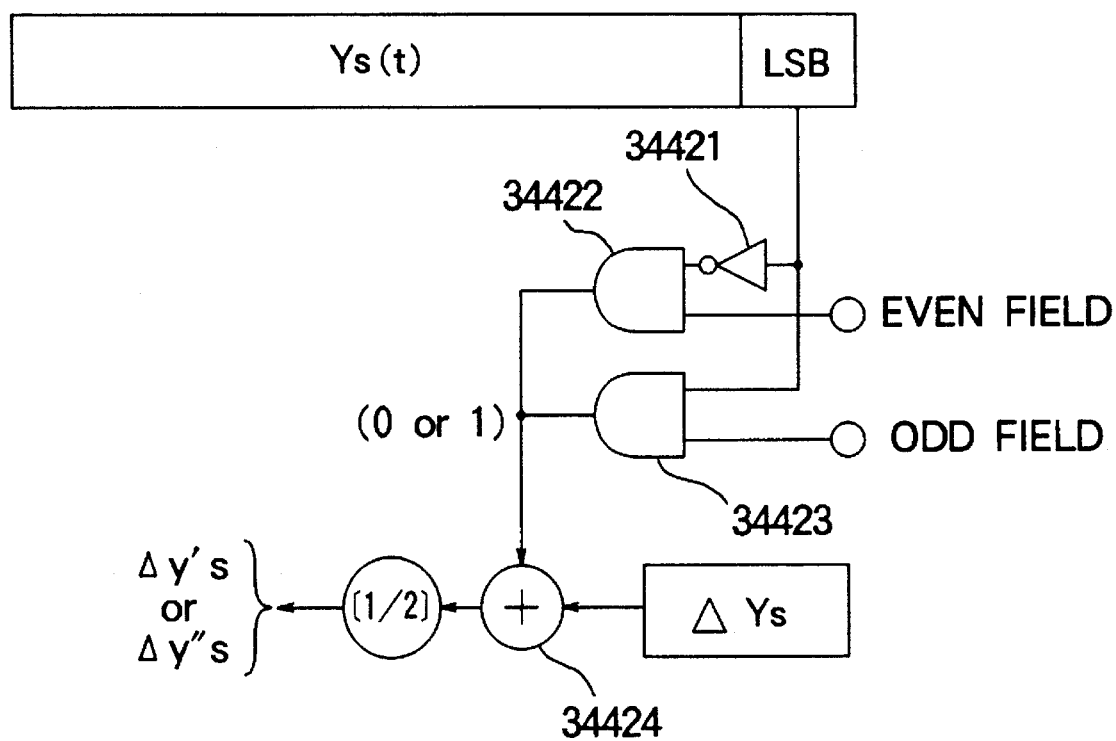
FIG. 7C is a configuration diagram of a circuit for calculating numbers of joined input lines in even and odd fields.

FIG. 7C is a diagram of a circuit configuration for calculating the numbers of joined input lines $\Delta$y's and $\Delta$y"s in the even and odd fields, wherein reference numeral 34421 designates a NOT circuit; 34422, 34423 AND circuits; and 34424 an adder.

In an even field, the lower terminal of the AND circuit 34422 is fed with 1 so that LSB(Ys(t)) inverted by the NOT circuit 34421 is outputted as it is from the AND circuit 34422. The lower terminal of the AND circuit 34423 in turn is fed with 0 so that 0 is outputted from the AND circuit 34423. On the other hand, in an odd field, the lower terminal of the AND circuit 34423 is fed with 1 so that LSB(Ys(t)) is outputted as it is from the AND circuit 34423, while the lower terminal of the AND circuit 34422 is fed with 0 so that 0 is outputted from the AND circuit 34422. The outputs of the AND circuits 34422, 34423 are added to the number of joined scan lines $\Delta$ys by the adder, the sum is divided by two, and thereafter digits below the decimal point are rounded off, thus calculating $\Delta$y's in the even field and $\Delta$y"s in the odd field, respectively.

Figure 8:
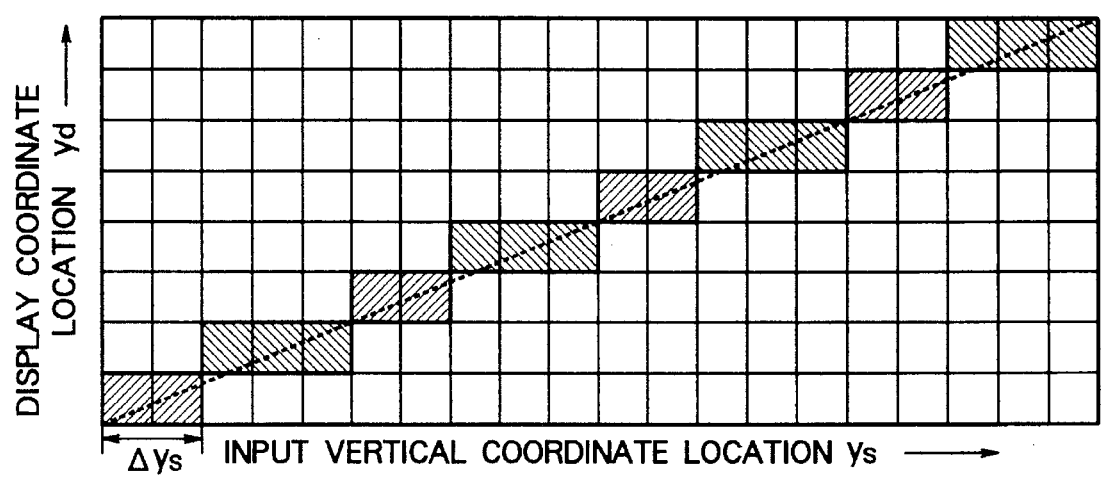
FIG. 8 is a diagram for explaining a function for converting input lines into display lines according to the present invention.

FIG. 8 shows the principle of how the coordinates of the scan lines are converted in the circuit configurations as shown in FIGS. 6–7A. More specifically, the relation of a display coordinate location yd to an input vertical coordinate location ys is represented by a conversion ratio (the gradient of the straight line indicated by a broken line). The gradient becomes easier as the conversion ratio is smaller. Since the conversion processing is performed in integer units, the unit with digits below the decimal point being rounded off, i.e., a correspondence relationship represented by thick-line rectangular frames filled with hatchings is used for the conversion. Stated another way, the conversion is performed such that the width of each rectangle on the input coordinate represented by the abscissa axis, indicated by $\Delta$ys, corresponds to a scan line on the display coordinate represented by the ordinate axis.

$\Delta$ys in FIG. 8 is calculated by the conversion factor register 3431, adder 3432, and vertical increment register 3433 in FIG. 6. This calculation permits an arbitrary reduction ratio to be highly accurately converted by adding an inverse of a reduction ratio R including decimal fraction, set in the conversion factor register 3431, to the vertical increment register 3433 each time the display vertical coordinate is increased by one scan line, deriving its integer portion as $\Delta$ys, and employing the remaining decimal fraction rem in the next calculation loop.

$\Delta$ys derived herein is supplied to the vertical filtering circuit 344 as well as employed in the next calculation for the input scan line vertical coordinate.

The vertical coordinate operation register 3434 in FIG. 6 holds the calculation result Ys(t), i.e., the joint boundary of an input scan line currently under processing, to which $\Delta$ys is sequentially accumulated. A timing of renewing Ys(t) by adding $\Delta$ys thereto is immediately before the input scan line vertical coordinate enters the next boundary, i.e., Ys(t+1), and a comparison therefor is determined by a comparator 3437.

Figure 9:
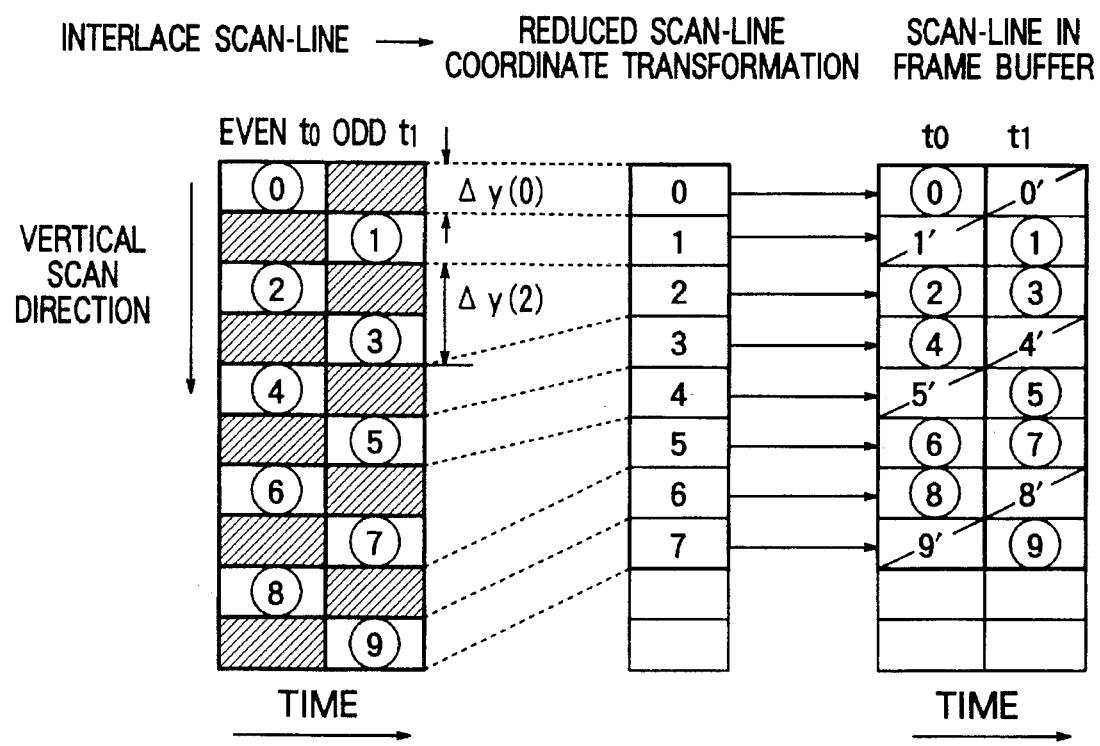
FIG. 9, is a diagram illustrating the principle of a converting method according to the present invention, and showing an example of a basic conversion procedure when a conversion factor is 8/10.
Figure 10:
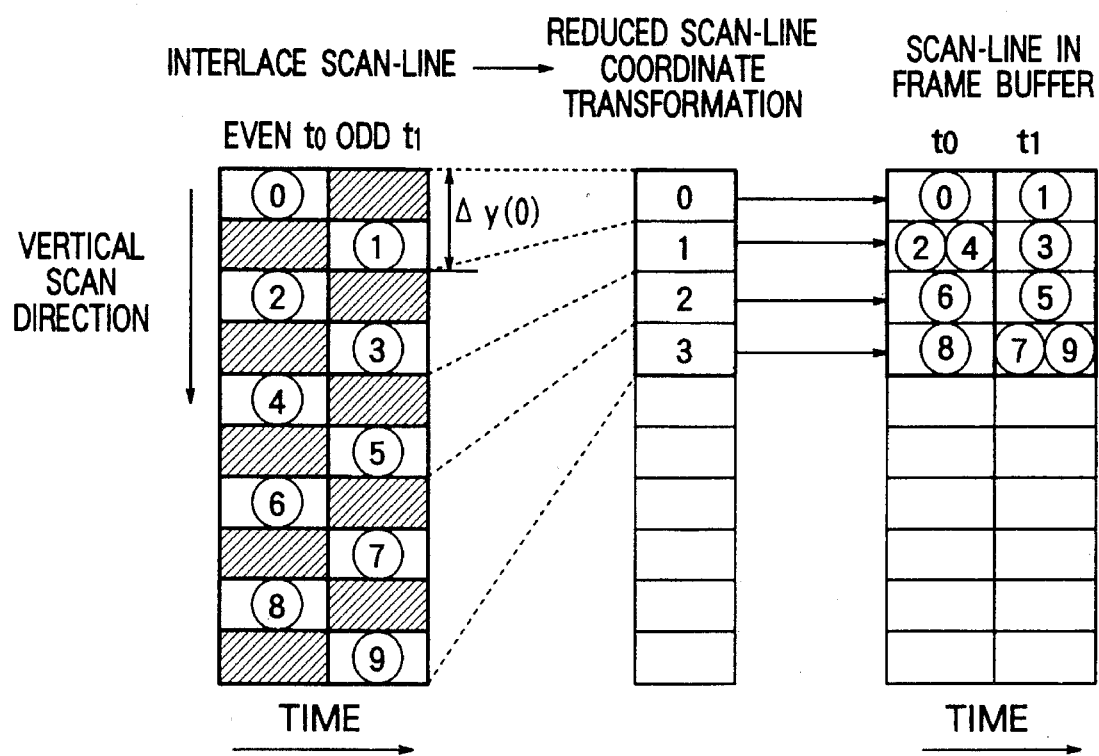
FIG. 10, is a diagram showing the principle of the converting method according to the present invention, in an example of a basic conversion procedure when the conversion factor is 4/10.

In the present invention, as shown in FIGS. 9 and 10, the scan line conversion for reduction is performed on the basis of scan lines in the frame, whereas, when a plurality of input scan lines correspond to a single display scan line for reduction, the plurality of scan lines are processed separately in the even field and the odd field.

In this event, for separately joining and filtering scan lines in the even and odd fields, determination must be made by coordinate values of even and odd scan lines on the frame in the respective field periods. For this reason, the input scan line counter 3436 sets an initial value to an even number or an odd number for each period and is incremented by "+2" every time the horizontal synchronizing signal Hsync is reached. An initially set value at this time is '0' in the case of an even number by the vertical synchronizing signal Vsync/E in the even field, or '1' in the case of an odd number by the vertical synchronizing signal Vsync/O in the odd field.

This is performed in order to determine in advance whether the next scan line location equals or exceeds the next joint boundary start location Ys(t+1) by indicating the coordinate value of the next scan line which is equal to the current coordinate value plus two.

In the example of FIG. 9, when four input scan lines are to be reduced to three display scan lines, a case in which one input scan line corresponds to one display scan line is combined with a case in which two input scan lines correspond to one display scan line, depending on the display coordinate location, to produce a reduction which is not a simple ¾ to 1/n (n: an integer) conversion. In this event, the number of joined scan lines $\Delta$ys is set under the coordinate system of the frame which includes both the fields, irrespective of even or add scan lines. As a result, in a display frame buffer of FIG. 9, input even scan line data (circled numbers indicate input scan line numbers) are written into corresponding locations in a period t0 of the even field, while input odd scan line data are written in a period t1 of the odd field. In this event, data of a scan line which is written only in one of the even and odd periods is left in the next period. For example, in the period t1 of the odd field, 0 remains as it is as 0', and 1 written in the previous field (odd field) remains as it is as 1' in the period t0.

On the other hand, when a reduction of ½ or less is to be made as shown in FIG. 10 (for example, a reduction of 4/10), the number of joined lines is two or more, so that no display scan line exists which is free from renewal, and either even or odd scan line data is written. When $\Delta$ys is three or more, a situation occurs where two or more scan lines correspond to one display scan line at the period of one field, in which case data on a plurality of scan lines are averaged in correspondence to dots, and average values are written as display data.

In this way, as shown in FIGS. 9 and 10, a plurality of scan lines are transformed to a display scan line for each field. In FIG. 9 where the reduction ratio is large, display scan lines (represented by numbers not circled), which are not transformed, may appear in the even (t0) and odd (t1) fields. This takes a form of a mixture of an input scan line in either of the even and odd fields which is written and is not renewed in the period of the other field (for example, 0 and 0', 1 and 1') and input scan lines of both the even and odd fields which are alternately written into one and the same display scan line (for example, 2 and 3). Although flickers occur because scan lines of the two fields are alternately written into one and the same display scan line, they are flattened by the afterglow effect of the CRT or the like and the after-image effect of human's eyes. Since an average value of the luminance is sensed by human's eyes, it is possible to obtain similar effects to those produced by a transformation using a frame memory.

On the other hand, when the reduction ratio is smaller so that a plurality of input field scan lines correspond to one display scan line as shown in FIG. 10 (for example, 2 and 4), an averaged interval between corresponding scan lines in a video signal is calculated for each field to correspond the same to one display scan line. Also in this case, images of averaged scan lines in the even and odd fields alternately appear in one scan line at the period of one field. Similarly to the case of FIG. 9, an average value of both is sensed by human's eyes, thus making it possible to obtain effects similar to the case where an input field memory is used to collectively average scan lines in a frame, i.e., in both the even and odd fields.

FIG. 11 numerically shows how the foregoing processing is performed with the reduction ratio R equal to 4/10(1/R= 2.5) being giving as an example.

Yd indicates a display coordinate location; Ysf an input coordinate location, represented in decimal number, corresponding to the display coordinate Yd. Ys(t) is an integer portion extracted therefrom which indicates the scan line joint boundary in the coordinate transformation and is equal to the value of accumulated $\Delta ys$. Ys(t+1) in the next column indicates the next boundary which is equal to Ys(t) plus $\Delta ys$.

ys(t) in the next column indicates a location (number) of an input scan line which is joined to one display scan line Yd, the coordinates of which are located in the frame. Therefore, the even and odd fields are expressed respectively by assigning even numbers and odd numbers to the scan line numbers.

In ys(t+1) in the next two columns, for determining the joined scan line boundary for each of the even and odd fields, a calculation is made for the next line in the same field as ys(t'), i.e., a line number larger than ys(t') by two, by means of the input vertical scan line counter 3436 in FIG. 6. Then, by comparing Ys(t+1) with ys(t'+1) in the comparator 3437 to see whether the following condition is satisfied:

$$Ys(t+1) \leq ys(t'+1)$$

it is recognized that an input scan line currently under processing is the last scan line corresponding to the display scan line. Then, $\Delta ys$, Ys(t) and Ys(t+1) are renewed at the end.

For example, when Yd=0 in the first line (the first line in the display coordinates), input lines subjected to reduced display on the display line Yd=0 are lines 0 (even) and 1 (odd) shown in the column ys(t'). This means that the first line within input lines corresponding to the display line Yd=1 shown in the next row is Ys(t)=2 (rounding off the decimal number of Ysf=2.5), and input lines having a number smaller than that, i.e., those up to input line 1 are reduced for display on the display line 0. It is Ys(t+1) that gives the boundary between the display lines 0 and 1 and takes the same value as the first line number ys(t')=2 within input lines corresponding to the next display line.

Here, when a reduced display is performed on the display line Yd=0, the input line ys(t')=0 is first processed in the even field. The next input line at this time is ys(t'+1)=2 which is compared with Ys(t+1)=2. In this case, since the condition of Ys(t+1)<ys(t'+1) is satisfied, the input line 0 only corresponds to the display line 0.

Next, input lines corresponding to the display line 1 are those from the line 2. While determining the boundary condition in a similar manner, the input line 2 and input line 4 corresponds to the display line 1. In this way, input lines are sequentially corresponded to display lines.

On the other hand, in the odd field, the first input line corresponding to the display line 0 is the line 1, and the next input line is ys(t'+1)=3, so that the input line 1 only is correspond to the display line 0, similarly with the condition of Ys(t+1)<ys(t'+1). The similar rule applies to the next display line 1 which corresponds to the input line 3.

In this way, input lines are sequentially corresponded to display lines for both the even and odd fields independently of each other.

Figure 12A:
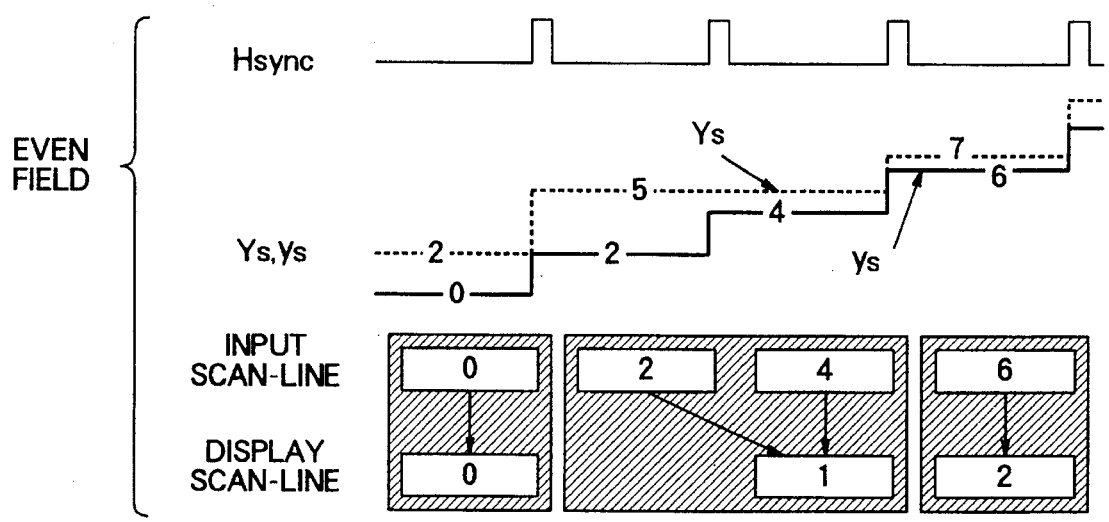
FIG. 12A is an explanatory diagram of operation timing in an even field in the embodiment of FIG. 10.
Figure 12B:
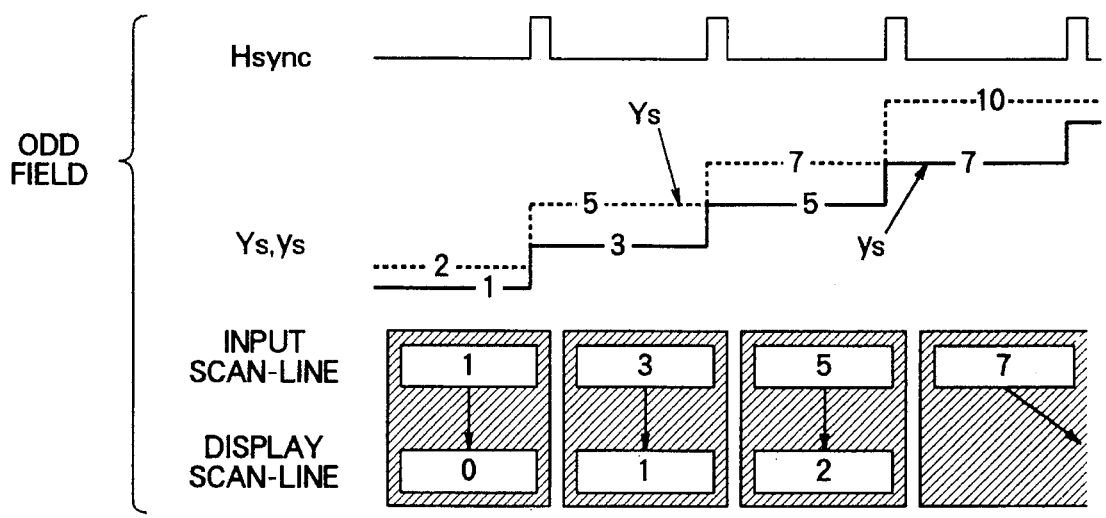
FIG. 12B is an explanatory diagram of operation timing in an odd field in the embodiment of FIG. 10.

FIGS. 12A, 12B show the operation timing, where FIG. 12A depicts the operation of the even field; and FIG. 12B the operation of the odd field. In the even field, an even input line ys(t')=0 is shown to correspond to the 0th display scan line; ys(t')=2 and 4 to the first display scan line; and ys(t')=6 to the second display scan line. Similarly, in the odd field, ys(t')=1 corresponds to the 0th display scan number; ys(t')=3 to the first; and ys(t')=5 to the second scan line, respectively. These compare to the example of FIG. 10.

It has conventionally been necessary to perform processing such as once storing a one-frame portion of video signals in a frame memory, thereafter reading out scan line data in sequence, and writing the data into a frame buffer for display after filtering processing, so that a large capacity of frame memory for input has been indispensable.

If such a frame memory for input is removed, the filtering processing associated to the reduction must be performed in field units. Since the filtering processing is performed independently in each field, the processing must be carried out with video signals including half of the effective scan lines. In the even field, for example, five scan lines (0, 2, 4, 6, 8) in an interlace field must be used to display eight scan lines (0–7) on a display frame. For this reason, a problem arises that the number of scan lines in a field is less than display scan lines after conversion in spite of the reduction, so that the substantial resolution becomes lower in a reduced image.

Figure 13:
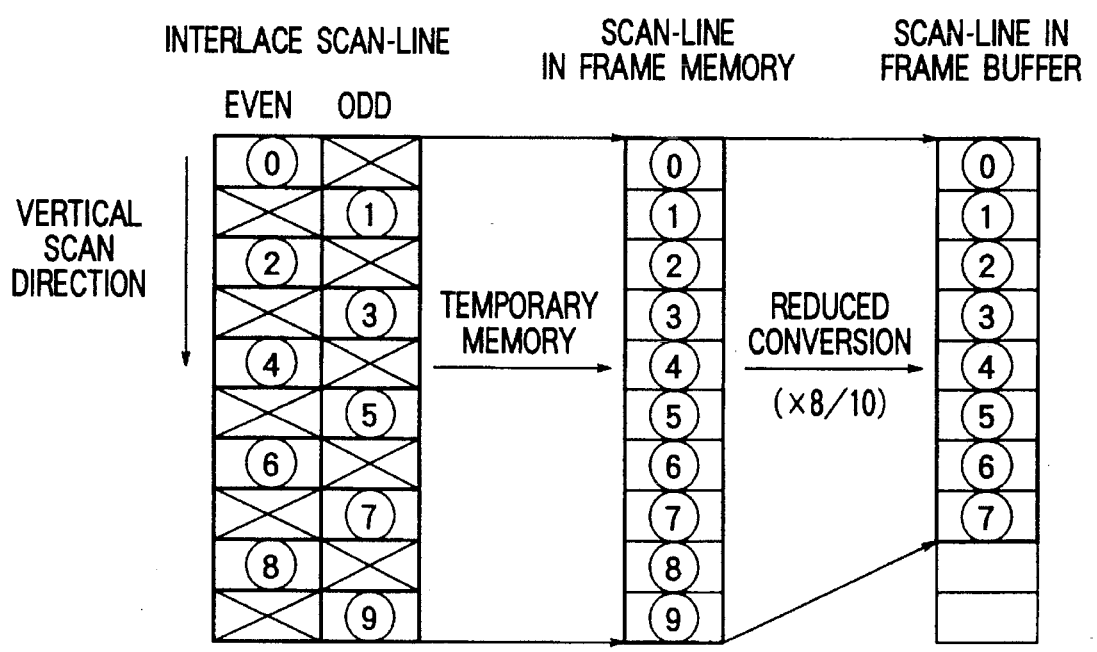
FIG. 13 is an explanatory diagram of a scan line converting method according to a prior art example.
Figure 14:
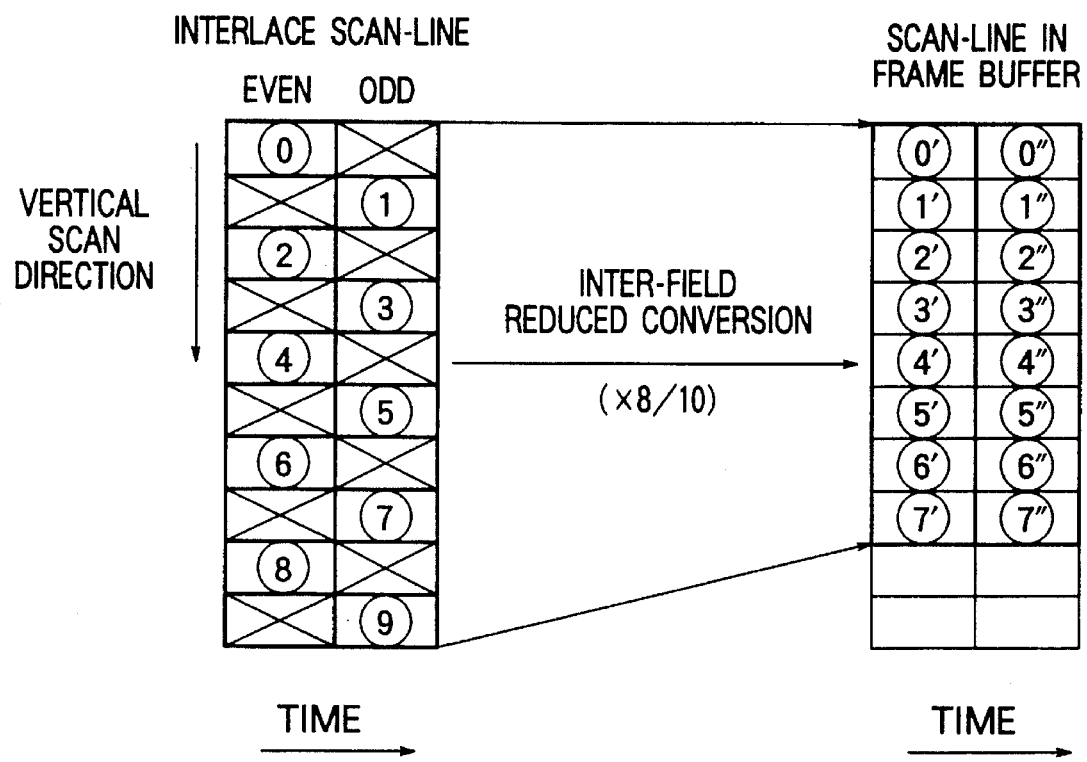
FIG. 14 is an explanatory diagram of a procedure of the scan line conversion when a frame memory for input is removed from the example of FIG. 12.

In contrast, FIG. 13 illustrates this as illustrated by FIG. 14, according to the method of the present invention, similar effects to the case of employing a memory for input are obtained, as is apparent also from the examples of FIGS. 9 and 10.

Figure 15:
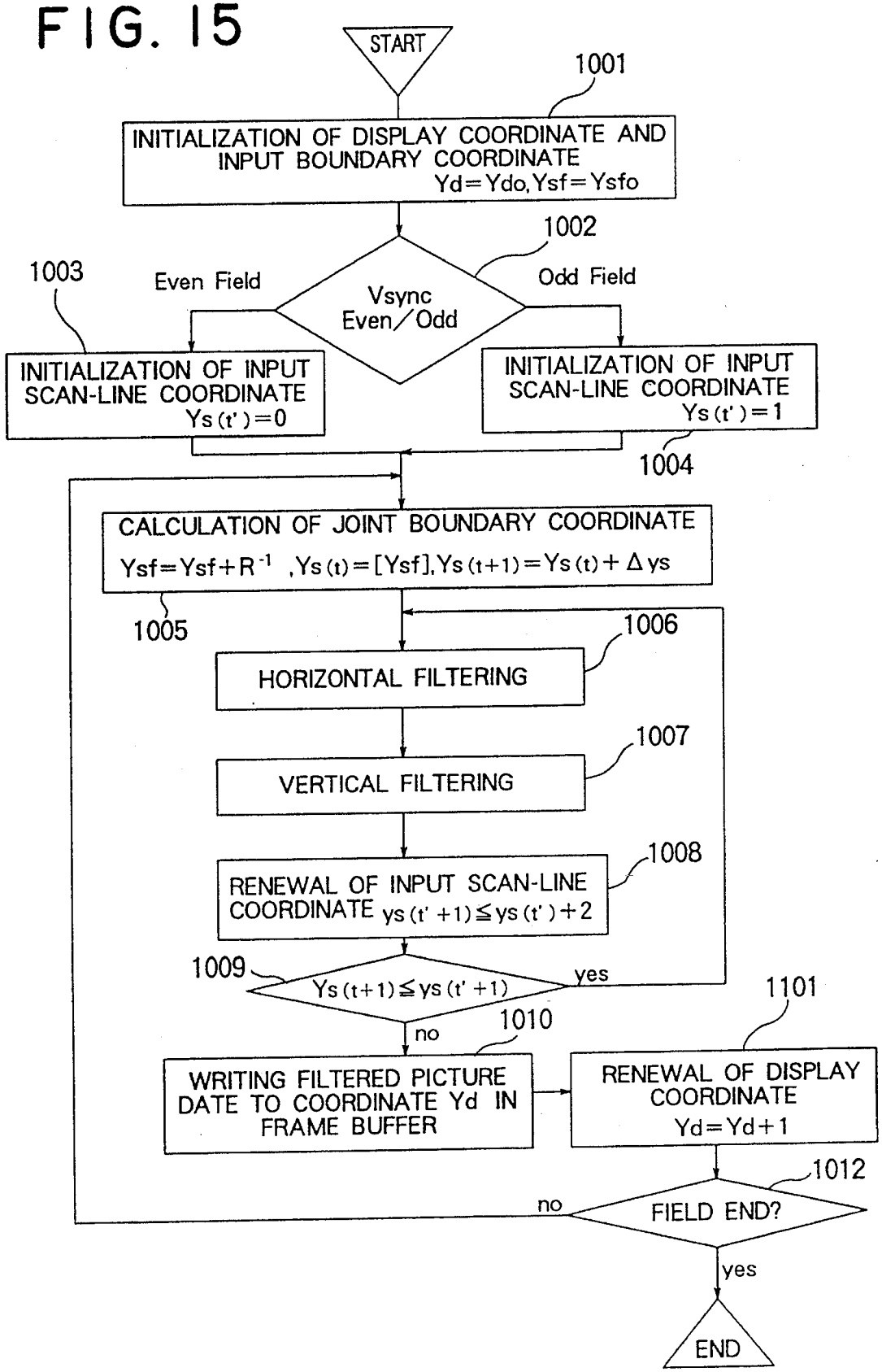
FIG. 15 is a flow chart of another embodiment of the present invention.

Next, FIG. 15 shows in a flow chart form an embodiment which provides a similar function of the scan line coordinate conversion circuit 34 in the scan converter of FIG. 4 with a combination of a digital signal processor (DSP), memories and a program. This program is started by the vertical synchronizing signal of an input video signal so that this processing is repeated every time the vertical sync of the even and odd fields occurs.

In FIG. 15, the display coordinate Yd and input boundary coordinate (expressed in decimal number) Ysf are initialized at step 1001, and determination is made at step 1002 of whether it is an even or odd field. The even input line coordinate ys(t') is initialized (ys(t')=0) at step 1003, and the odd input line coordinate ys(t') is initialized (ys(t')=1) at step 1004. The joint boundary coordinate Ys(t+1) is calculated in the line joining for filtering at step 1005, filtering processing is performed in the horizontal direction at step 1006, another filtering processing is performed for vertical line reduction at step 1007, the input line coordinate ys(t') is renewed at step 1008, and it is determined at step 1009 whether or not the input coordinate ys(t'+1) is within the joint boundary. The filtered results are stored in a frame buffer at step 1010, the display coordinate Yd is renewed at step 1011, and determination is made at step 1012 of whether the field is at the end. If not, the process returns to step 1005.

In such a processing flow, at step 1001, the origin of the display coordinate of a picture to be displayed in the frame buffer is set to Yd0, while the coordinate of the origin of an input video signal is set to Ysf0 in decimal number representation. In this case, although the origin should be initially set for the horizontal direction, it is omitted in this explanation.

Next, after the determination as to whether the field is even or odd has been made at step 1002, if the field has been determined to be even, the input line coordinate is initialized to an even number or zero at step 1003 in order to start the processing with the line 0. At step 1004, it is initialized to an odd number or one if it is determined to be an odd field.

Subsequently, the processing sequentially progresses while counting the lines, wherein processing for even lines is performed in the even field while processing for odd lines is performed in the odd field by adding two every time a line is completed.

Next, at step 1005, an inverse of the reduction ratio R is employed to calculate a line coordinate boundary at which lines are joined for reduction. In this event, Ysf in decimal number representation is employed such that an inverse of R is sequentially accumulated to Ysf to derive the input line joint boundary coordinate corresponding to a display line. Then, an actual input line joint boundary is obtained from the rounded integer value Ys(t).

[Ysf] in FIG. 15 represents a Gaussian symbol and means an integer of Ysf in decimal number representation with its digits below the decimal point being rounded off. Also, Δys is added to Ys(t) to derive the next input line joint boundary coordinate Ys(t+1).

Next, after an input line is fetched and filtered in the horizontal direction at step 1006, filtering is performed in the vertical direction. This processing multiplies a pixel value of the line by a factor for joining a plurality of lines to one line and accumulates the product in the line memory.

Incidentally, the first line at this time is not subjected to the addition but is simply transferred to the horizontal line memory.

Thereafter, the input line coordinate ys(t') is renewed by incrementing the same by two at step 1008.

In this event, input lines to be joined are joined to a single display line Yd while the input line coordinate ys(t'+1) is small with respect to the next input line joint boundary coordinate Ys(t+1). Therefore, the determination is made at 1009 whether the input line coordinate ys(t'+1) equals or exceeds the input line joint boundary coordinate Ys(t+1), in order to determine whether or not the last line in a joined line group has been reached. If the former does not exceed the latter, the flow returns to 1006 to continue the filtering. If it exceeds, data of the joined lines in the horizontal line memory is transferred to the coordinate Yd in the frame buffer at 1010, and after the display coordinate Yd is renewed at 1011, the end of the field is determined at 1012. If it is not at the end, the flow returns to 1005 to continue the processing, while the filtering processing for the associated field is terminated if it is at the end.

The foregoing processing is repeated every time the synchronizing signal of an input field occurs.

Also in this embodiment, while the frame memory for input is made unnecessary, a high quality picture can be provided which is equivalent to that converted by use of a frame memory.

As described above, according to the present invention, when an interlace video signal such as that for television is superimposed on a picture on a display apparatus for a computer with the size thereof being variable, coordinate conversion calculations are performed from an input video signal to a picture to be displayed on the basis of the coordinate system of the picture in frame units, and this is filtered independently for each field, only using video data in the field, whereby a compact scan converter can be implemented without the necessity of a frame memory for input which would be generally required when a high quality picture is desired.

This effect is useful particularly when the scan converter is built in a personal computer or the like as a board and advantageous in reducing the cost and power consumption.

We claim:

1. A video signal converting apparatus for converting an interlace video signal into a non-interlace video signal for reduction, said apparatus comprising:

a video decoder for receiving a composite video signal as an input and separating therefrom a horizontal synchronizing signal, a vertical synchronizing signal, and component video signals;

an A/D converter for receiving said component video signals from said video decoder as inputs, performing A/D conversion, and outputting first video data;

first means for converting said first video data from said A/D converter into second video data in the horizontal direction for reduction;

a vertical coordinate conversion circuit for receiving said horizontal synchronizing signal and said vertical synchronizing signal from said video decoder as inputs and outputting a number of joined scan lines based on a display scan line vertical coordinate location and a frame coordinate system of the interlace video signal corresponding thereto in accordance with a previously given reduction ratio;

a vertical filtering circuit for receiving said second video data from said first means and said number of joined scan lines from said vertical coordinate conversion circuit as inputs, calculating a number of joined input lines based on said number of joined scan lines, calculating an average value of dots between input scan lines for a portion of said second video data corresponding to said number of joined input lines, and outputting third video data;

a frame buffer for writing thereinto said third video data from said vertical filtering circuit; and a control circuit for receiving a display scan line horizontal coordinate location and said display scan line vertical coordinate location from said vertical coordinate conversion circuit as inputs and controlling the writing of said third video data into said frame buffer based on each coordinate location.

2. A video signal converting apparatus according to claim 1, wherein said vertical coordinate conversion circuit comprises:

a first adder for receiving said number of joined scan lines as an input and sequentially accumulating said number of joined scan lines;

an input scan line counter for receiving said horizontal synchronizing signal and said vertical synchronizing signal from said video decoder as inputs, setting alternately different initial values when said vertical synchronizing signals of even fields and odd fields, respectively, are alternately inputted, adding a predetermined constant value when said horizontal synchronizing signal of each field is inputted, and counting a number of input scan lines of said interlace video signal as counted in a frame coordinate system;

a vertical coordinate location counter for receiving said vertical synchronizing signal from said video decoder as an input, setting an initial value when said vertical synchronizing signal is inputted, and outputting said display scan line vertical coordinate location; and second means for receiving a previously given reduction ratio as an input and calculating said number of joined scan lines based on the frame coordinate system of said interlace video signal corresponding to said display scan line vertical coordinate location; and said means for calculating said number of joined scan lines and said vertical coordinate location counter renew said number of joined scan lines and said vertical coordinate location based on the result of a comparison between an output of said first adder and an output of said input scan line counter.

3. A video signal converting apparatus according to claim 2, wherein said vertical filtering circuit comprises:

a factor circuit having third means for inverting and outputting the least significant bit of the output of said first adder when a field to be processed is even; fourth means for outputting the least significant bit of the output of said first adder when a field to be processed is odd; a second adder for adding an output of said third means or an output of said fourth means to said number of joined scan lines; and fifth means for reducing the output of said second adder by a half, rounding off digits below the decimal point, and outputting an inverse of the resultant value;

a multiplier for multiplying said second video data by an output of said factor circuit; and a third adder for accumulating outputs of said multiplier.

4. A video signal converting apparatus according to claim 1, wherein said first means comprises:

a horizontal coordinate conversion circuit for receiving said horizontal synchronizing signal from said video decoder as an input and outputting said display scan line horizontal coordinate location and a number of joined dots based on the previously given reduction ratio; and a horizontal filtering circuit for receiving said first video data from said A/D converter and said number of joined dots from said horizontal coordinate conversion circuit, calculating an average value for dots in a portion of said first video data corresponding to said number of joined dots, and outputting said second video data.

5. A video signal converting apparatus according to claim 2 wherein said first means comprises:

a horizontal coordinate conversion circuit for receiving said horizontal synchronizing signal from said video decoder as an input, and outputting said display scan line horizontal coordinate location and a number of joined dots based on the previously given reduction radio; and a horizontal filtering circuit for receiving said first video data from said A/D converter and said number of joined dots from said horizontal coordinate conversion circuit, calculating an average value for dots in a portion of said first video data corresponding to said number of joined dots, and outputting said second video data.

6. A video signal converting apparatus according to claim 3, wherein said first means comprises:

a horizontal coordinate conversion circuit for receiving said horizontal synchronizing signal from said video decoder as an input, and outputting said display scan line horizontal coordinate location and a number of joined dots based on the previously given reduction ratio; and a horizontal filtering circuit for receiving said first video data from said A/D converter and said number of joined dots from said horizontal coordinate conversion circuit, calculating an average value for dots in a portion of said first video data corresponding to said number of joined dots, and outputting said second video data.

7. A video signal converting apparatus for converting an interlace video signal into a non-interlace video signal in the vertical direction for reduction, said apparatus comprising:

a vertical coordinate conversion circuit for receiving a horizontal synchronizing signal and a vertical synchronizing signal included in the interlace signal as inputs, and outputting a number of joined scan lines based on a display scan line vertical coordinate location and a frame coordinate system of the interlace video signal corresponding thereto in accordance with a previously given reduction ratio; and a vertical filtering circuit for receiving video data included in the interlace video signal and said number of joined scan lines from said vertical coordinate conversion circuit, calculating a number of joined input lines based on said number of joined scan lines, and calculating and outputting an average value of dots between input scan lines for a portion of said video data corresponding to said number of joined input lines.

* * * * *